US006527456B1

(12) United States Patent
Trezza

(10) Patent No.: US 6,527,456 B1
(45) Date of Patent: Mar. 4, 2003

(54) CLUSTER INTEGRATION APPROACH TO OPTICAL TRANSCEIVER ARRAYS AND FIBER BUNDLES

(75) Inventor: John A. Trezza, Nashua, NH (US)

(73) Assignee: Teraconnect, Inc., Nashua, NH (US)

( * ) Notice: Subject to any disclaimer, the term of this patent is extended or adjusted under 35 U.S.C. 154(b) by 0 days.

(21) Appl. No.: 09/687,337

(22) Filed: Oct. 13, 2000

Related U.S. Application Data

(63) Continuation-in-part of application No. 09/653,647, filed on Sep. 21, 2000, now Pat. No. 6,434,308.
(60) Provisional application No. 60/159,166, filed on Oct. 13, 1999, and provisional application No. 60/228,977, filed on Aug. 30, 2000.

(51) Int. Cl.$^7$ .................................................. G02B 6/36
(52) U.S. Cl. .............................. 385/89; 385/88; 385/116
(58) Field of Search ........................... 385/89, 88, 115, 385/116

(56) References Cited

U.S. PATENT DOCUMENTS

| 4,862,231 A | 8/1989 | Abend |
| 4,890,895 A | 1/1990 | Zavracky et al. |
| 4,989,935 A | 2/1991 | Stein |
| 5,191,219 A | 3/1993 | Linke |
| 5,241,610 A | 8/1993 | Labiche et al. |
| 5,289,303 A | 2/1994 | Cloonan et al. |
| 5,333,225 A | 7/1994 | Jacobowitz et al. |
| 5,394,490 A | 2/1995 | Kanto et al. |
| 5,420,954 A | 5/1995 | Swirhun et al. |
| 5,428,704 A | 6/1995 | Lebby et al. |
| 5,472,914 A | 12/1995 | Martin et al. |
| 5,506,383 A | 4/1996 | Chen |
| 5,532,856 A | 7/1996 | Li et al. |
| 5,568,574 A | 10/1996 | Tanguay, Jr. et al. |
| 5,761,350 A | 6/1998 | Koh |
| 5,768,456 A | 6/1998 | Knapp et al. |
| 5,818,984 A | 10/1998 | Ahmad et al. |
| 5,848,053 A | 12/1998 | Ardon |
| 5,857,042 A | 1/1999 | Robertson et al. |
| 5,858,814 A | 1/1999 | Goossen et al. |
| 5,892,605 A | 4/1999 | Stevens |
| 5,896,213 A | 4/1999 | Nagahori et al. |
| 5,909,303 A | 6/1999 | Trazza et al. |
| 5,943,456 A | 8/1999 | Buchholz et al. |

FOREIGN PATENT DOCUMENTS

JP          405088028 A          4/1993

OTHER PUBLICATIONS

M. Ajmone Marsan et al, Modelling Slotted Multi–Channel Ring All–Optical Networks, *IEEE*, 1997, p. 146–153.
Marco Ajmone Marsan et al, Access Protocols for Photonic WDM Multi–Rings with Tunable Transmitters and Fixed Receivers, *SPIE*, pp. 59–72, vol. 26921.
Carl Beckmann, Applications: Asynchronous Transfer Mode and Synchronous Optical Network, *Handbook of Fiber Optic Data Communication*, 1998, pp. 385–414, Academic Press.
Floyd E. Ross, An Overview of FDDI: The Fiber Distributed Data Interface, *IEEE Journal on Selected Areas in Communications*, Sep. 1989, pp. 1043–1051, vol. 7 No. 7.

Primary Examiner—Rodney Bovernick
Assistant Examiner—Sung Pak
(74) Attorney, Agent, or Firm—Maine & Asmus

(57) ABSTRACT

An apparatus for efficiently transferring data on and off of an integrated circuit in a network node. In one embodiment, the chip has a silicon substrate and direct interconnection with optical fibers. In particular, the present invention pertains to an arrangement of the transmitters and receivers, along with processing circuitry and optical fibers, so signals are routed most efficiently for a given type of architecture, such as ring, star, routers, and crossbars. In one embodiment, the transmitters and receivers are interdigitated to provide bi-directional optical channels. An additional feature of the invention is the mating of the optical fibers to the transmitters and receivers, such that there is a direct correspondence on both ends of the optic fibers. The optical fibers of the transmitters and receivers can be grouped or bundled together to allow reconfiguration of different topology or to improve system performance by bundling together certain fibers.

7 Claims, 8 Drawing Sheets

POINT-TO-POINT
LINK

RING
NETWORK

CLUSTER INTEGRATION APPROACH TO OPTICAL TRANSCEIVER ARRAYS AND FIBER BUNDLES

CROSS REFERENCE TO RELATED APPLICATIONS

This application claims priority from U.S. patent application Ser. No. 60/159166 filed on Oct. 13, 1999 and U.S. patent application Ser. No. 60/228,977 filed on Aug. 30, 2000 that are incorporated herein by reference for all purposes. This application is a continuation in part of U.S. application, Ser. No. 09/653,647 filed Sep. 1, 2000, now U.S. Pat. No. 6,434,308 issued Aug. 13, 2002 entitled OPTOELECTRONIC CONNECTOR SYSTEM by the same inventor, which is hereby incorporated by reference for all purposes.

BACKGROUND OF THE INVENTION

1. Technical Field of the Invention

This invention most generally relates to data transfer and broadband communication networks within a parallel computing system or a local area network. In particular, the present invention relates to an arrangement of transmitters and receivers and associated fibers for efficient data transfer in a network using fiber optics wherein the fiber optics are bundled and routed for a specific application.

2 Background of the Invention

Technological advancements have dramatically increased the capabilities and possibilities of computing electronics. The increased bandwidth and data transfer rates have resulted in commercial innovation and scientific advancements in many fields. However, data transfer continues to be a bottleneck. This is true for data transfer within an integrated circuit (IC), from one chip to another, from hybrid circuit to hybrid circuit, from integrated circuit board to another integrated circuit board, and from system to system.

Another driving factor leading to ever increasing demands for faster data transfer rates is the need to do tasks that are more complex, requiring multiple computing nodes to cooperate. Digital signal processing, image analysis, and communications technology all require a greater bandwidth. The demand for increased data transfer capability and greater bandwidth translates into increases in both the speed of the data transfer, and the amount of data that is transferred per unit time.

In general, the problems associated with data transfer within an IC and on a system network are similar. With respect to IC's, increasing the rate of data transfer can be accomplished by increasing the number of data transfer lines and transferring the data in parallel, and/or increasing the transmission speed. There are limitations to the number of I/O lines such as spacing and size requirements, noise problems, reliability of connectors, and the power required to drive multiple lines off-chip. Increasing the transmission speed also has some limitations, as increasing the speed also increases power requirements, introduces timing skew problems across a channel, and usually requires more exotic processing than is standard practice. Combining higher clock speeds and more I/O connections in order to increase bandwidth is exceedingly difficult and impractical using electronics alone.

Using traditional technology, there is a practical upper limit to the number of bit lines that are possible. So long as the technology is based on signals being of an electrical nature, each increase in the number of lines means a corresponding increase in the number of conductors that are required, and the associated problems that are well known in the art.

Due to IC packaging constraints, and problems associated with the connections between the IC substrate and the IC package, there is a limited electronic I/O bandwidth. The most common manufacturing techniques used to interconnect an integrated circuit VLSI die with a package are wire-bonding, flipchip bonding, and tape automated bonding. The maximum clock rate of an I/O pin is typically a few hundred Mbps (millions of bits per second) due to capacitance and inductance and crosstalk associated with the connections between the die and the package. Therefore, the maximum I/O bandwidth of a single IC package is directly proportional to the number of pins times the clock rate per pin. In general, the maximum I/O bandwidth of a packaged IC is typically in the tens of Gigabits/second.

A computer system "bus" is an interconnection allowing communication between plug-in modules. The plug-in modules, typically printed circuit boards (PCB), connect to the bus on a backplane printed circuit board. The data transfers are controlled according to the bus protocol. Plug-in modules typically connect to the bus through edge connectors and drive the bus through high power bus transceivers. Various standards define the physical backplane PCB, the mechanical packaging and the bus protocols. There are also a number of bus standards, including PCI, VME, FutureBus+, and Nubus standards.

There are a number of limitations to the bus connection system. In order to transfer data, a plug-in module typically acts as a bus master, and distributed protocols are used to arbitrate between contending plug-in modules and to appoint the bus-master. To actually transfer data, a bus master inserts the information including address information and data in a series of individual word transfers over the bus. Words usually contain 32 bits and the duration of the word transfer is determined by the nature of the bus protocol. Latency in processing the address information and coordinating the transfer to/from the proper devices is a significant problem. If there are more than a few bus masters, contention for the shared resource (the bus) becomes a major problem, resulting in long wait times to gain mastership of the bus.

Also, capacitive loading on a bus due to the plurality of attached modules increases the propagation delay, which also impacts the data transfer rate. Capacitive loading also decreases the impedance of a bus line to a very low value, and results in high currents required to drive the bus at full speed. Improperly terminated bus lines result in multiple reflections of the transmitted signal. The reflections take one or more bus round trip delays to settle, resulting in a settling time delay that is a significant portion of the transfer cycle time for a bus.

The aforementioned problems limit the bandwidth of bus communications. In addition to low bandwidths, electronic busses lack multiple independent channels and cannot provide the parallelism required by large-scale parallel computing and communication systems. The busses are not scalable to interconnect hundreds of plug-in modules since the increasing capacitance, inductance and impedance problems place a limit on the data transfer speed, and the fact that the single channel is shared among many processing modules results in contention for the single "bottleneck" resource.

A "local area network" (LAN) is a means of interconnecting multiple computers. A variety of standards exist, with the most popular perhaps being the family of "Ethernet" standards (ANSI/IEEE standard 802.3 and others). Like a computer system bus, an Ethernet network consists of a shared medium (coaxial cable) over which all data is transferred. LANs typically have lower bandwidth than system busses, but allow nodes to communicate at larger distances. Several Ethernet standards exist, with data transfer rates of 10 Mbps (millions of bits per second), 100 Mbps and 1 Gbps. Nodes may be separated by distances of up to 100 meters using Ethernet, which is much greater than system bus dimensions that are typically a fraction of a meter.

In recent years, computer system and LAN equipment designers have begun using several techniques for increasing the throughput of data communications. The first is the use of "switched networks," also called "switch fabrics," to eliminate the contention for the single shared resource of a bus or shared-medium LAN. The second is the use of fiber optics to increase the clock speed, and hence the throughput, of data transfers.

In a switched network, the single shared medium is replaced by a series of switches that are interconnected with each other and to the computing nodes (the communication endpoints). All these connections are now point-to-point and usually unidirectional, which allows them to be clocked at a higher rate than comparable bussed connections due to lower capacitance and higher impedance, an additional advantage for electronic implementations. The primary advantage of switched networks is that one pair of nodes can communicate simultaneously with a second pair of nodes, as long as the two pairs do not use the same node-to-switch or switch-to-switch connections. Switched fabrics can also scale to hundreds or thousands of nodes, since all connections are point-to-point and capacitance does not grow linearly with the number of nodes.

One problem with switched networks is that some contention may still exist in the network when more than one pair of nodes tries to communicate, since they both may need to use the same switch-to-switch link along their paths. An ideal switched network is called a "crossbar" and consists of a single large switch that connects directly to all nodes in the system, and can provide contention-free communications among them.

A number of switched fabric standards exist now or have been proposed to replace system busses, including Myrinet, RaceWay, the Scalable Coherent Interconnect (SCI), RapidIO, and InfiniBand. These are sometimes called "system area networks" (SANs) or "storage area networks" if used to connect processors to disk drives. Switch fabric standards are also in widespread use for local area networks, including switched Ethernet, Myrinet, and Asynchronous Transfer Mode (ATM).

Traditional crossbar switches allow any combination of ports to connect simultaneously without internal contention. As a result, every connection must have an $N^2$ controller. For example, 16×16 full-crossbar has 16 input signals and 16 output signals. The 16 output signals are usually to the same 16 hosts, and these output signals have $16^2$ different combinations. Due to the complexity that accompanies the number of ports, and more importantly due to the fact that a large number of signals must fan in or fan out of a single device, it is rare to see a full crossbar larger than 16 ports. In addition, larger crossbar switches are fairly expensive.

A crossbar-switch is an efficient way for electronic equipment to communicate since there is a direct connection between the sender and the receiver. Unfortunately, because every piece of data flows through the switch, a switch failure takes down the entire network. As a result, systems are often built of smaller switches that permit redundancy. However, such redundancy also introduces inefficiencies that are well known and tolerated in the industry.

Typically, crossbar switches require that every port have N pins, where N is at least as wide as the data width (8 bits, for example), but may also including clock and control lines and perhaps separate ground or return lines for each signal. Consequently, a 16×16 port crossbar-switch with 20 lines per connection will have either 16 or 32 connectors and 640 wires. Increasing this number to a 64×64 switch with 64 lines each would require 8192 wires, which implies that the ASIC has 8192 pins just for signals. Even if the switch were built of multiple ASICs, the physical space required to attach 64 connectors is significant.

Data transfer protocols are established by a number of standards. These standards all employ standard ways of formatting data in discrete chunks called frames or packets. The packet or frame establishes the format of the data and the various fields and headers are encapsulated and transmitted across a network. A frame or packet usually includes a destination address, control bits for flow control, the data or payload, and error checking in the form of cyclic redundancy checks (CRC) codes or an error correcting code (ECC), as well as headers and trailers to identify the beginning and end of the packet. As information is communicated between devices or systems, the address information is checked by each device or system in the network, and eventually the device of interest receives the data.

Whether transferring data within a circuit or connecting system-to-system, the limited bandwidth of conventional hardware does not satisfy the marketplace. For high data rate transmissions, fiber optics transmit data at Gigabit data rates. Fiber optic communication systems allow information to be transmitted by means of binary digital transmission. The data or information that is to be transmitted is converted into a stream of light pulses, wherein the presence of a pulse corresponds to the transmission of a binary "one," and the absence of light corresponds to the transmission of a binary "zero." An optical receiver is used to convert the stream of light pulses into an electrical signal that is processed to determine the transmitted information.

Typically the optical transmitters are light emitting devices such as vertical cavity surface emitting lasers (VCSELS) and light detecting devices such as photodiodes. The optical transmitters and receivers may be encompassed in a separate or fabricated on the same substrate and with accompanying electronics. The fabrication process is well known in the art and U.S. Pat. No. 5,978,401 provides background materials, and is incorporated by reference.

The transmitters have driver circuitry that drives the VCSELS, while the receivers also have receiver circuitry for processing the received signals. The transmitter driver circuitry and the receiver driver circuitry is usually in the form of ASIC devices. The combination of the VCSELS and photodiodes along with the ASIC driver circuitry is called an optical transceiver. One embodiment for hybridization of the transceiver elements is via flip-chip bonding, which is generally explained in U.S. Pat. No. 5,858,814, incorporated by reference herein.

A fiber optic cable is used to transmit the optical data off the transceiver device and mates with the transceiver. A spacing problem exists when there are large arrays of transceivers and corresponding optic cables mating to, each emitter and detector. The coupling and alignment of these multiple fiber optic cables is exceedingly difficult and there is a substantial defect rate in large bundles.

Fiber-optic standards for LANs exist and are in-widespread use today, including the Fiber Distributed Data Interface (FDDI), FibreChannel and several ATM physical layers. Fiber optics are not in widespread use today for system busses, but some standards have been proposed and some prior art exists. Current optical networking systems employ high precision optical mirrors that are used in free-space data transmissions.

Some attempts have been made to address the aforementioned problems. The use of smart pixels to provide the required interconnection has been developed. "Smart Pixel" refers to the optical interconnection for digital computing systems such as switching systems and parallel-processor systems. For example, large numbers of optical transmitters and receivers are directly integrated with semiconductor electronic processing elements. The integrated optoelectronic circuits have several benefits., including efficiency of design.

However, there are limitations to the electronic interconnects used in current large scale computing and communication networks. The networks have more bandwidth than a bus by providing multiple independent high bandwidth communication channels. But, the cost of these multiple channels is a large number of electronic wires between cabinets and electronic traces on PCB's. The inductance and capacitance of these wires and traces necessitates the use of high power transceivers that consume large amounts of power. The inductance and capacitance of these channels also limits the maximum clock rate and the electrical channels are also susceptible to electromagnetic interference (EMI).

There is some prior art that is directed towards changing from metal traces on a backplane PCB to optical paths through free-space or an optical medium. These passive optical busses still suffer from many disadvantages associated with the electronic bus. The optical bus still supports a single communication channel (as in FDDI) so that data transfers still occur sequentially over the bus. The data transfer requires the same steps as in an electrical backplane, where a bus master is first selected and the bus master then broadcasts data over the optical bus which must be received by all plug-in module PCB's. These PCB's then perform packet processing to determine whether the packet is addressed to them. This architecture requires that every plug-in module PCB monitors all data on the optical bus. The limitation that every PCB monitor all the data on the optical bus limits the rate at which data is transmitted over the bus to the rate at which every PCB can receive and process the data.

The typical passive optical bus architectures require that optical signals be received on a photodetector array, converted to electronics, and then routed to an electronic IC for further processing. Hence, the peak bandwidth is limited to the peak I/O bandwidth of an electronic integrated circuit, typically tens of Gigabits/second. Thus the passive optical bus is simply a faster version of a conventional electronic bus and it does not provide the high bandwidth required by large-scale computing and communication systems.

Most often, the passive optical technology is used to provide point-to-point high bandwidth connectivity and nothing else. The underlying architecture does not support broadcast channels, one-to-many communications over a single channel, or one-to-all communications over a single channel, simultaneous many-to-many communications over multiple channels. The architecture simply implements multiple passive point-to-point interconnects with no broadcasting. Since this architecture cannot support broadcasting it will have limited use in computing and communications systems which require efficient broadcasting.

Furthermore, the passive optical architecture has power limitations as the number of receivers increases, because the architecture does not allow for the regeneration of optical signals. A fraction of each optical signal is delivered to each photodetector receiver through the use of partially reflective micromirrrors. This free-space technique allows an optical signal to be delivered to a small number of receivers, but it cannot be used to interconnect a large number of receivers since the original optical signal can only pass through a limited number of partially reflective mirrors before the signal is lost.

Overall, the complexity and cost of the prior art systems is delaying large-scale integration. Thus, there is a need for increased system bandwidth through both increased data rates and improved mechanical and electrical interconnects, that is robust, easier to manufacture, and cost-effective.

Latency is the amount of time it takes for data to be sent from a source node to a destination node. One of the key impediments to significantly increasing the speed with which communications devices can communicate with one another is the very limited capability of existing systems to transfer data in parallel. Another impediment is the need for reading and interpreting the address of each data packet, whether or not the data is intended for that particular device. The process of reading and interpreting packet destination addresses is done at each device in the network, and results in a dramatic limitation in the speed of data transfer within the network.

Although some researchers have demonstrated Terabits/s serial connection, the methodology is overly complex and the price and size of these systems is impractical for system area networks. Recent innovations have permitted wavelength division multiplexing (WDM) systems to increase their bandwidth considerably, however, this is primarily a telecommunications (wide-area networking—WAN) solution. WDM systems are still relatively large and expensive, but compared to laying new fibers across the country the cost of the transmitters and receivers seems insignificant. For a local area network (LAN) or system area networks (SANs), WDM is generally cost-prohibitive and often will not meet form-fit-factors requirements. For LANs/SANs, the problems preventing effective wide bandwidth are: connector size and reliability, channel skew, wire impedance, and power dissipation.

Various methods have been proposed for increasing the data throughput at each node of a network. Optoelectronic methods offer the widest bandwidth at this time. There has been some work incorporating optoelectronic circuits using III-V technology onto complimentary metal-oxide-semiconductor (CMOS) structures in silicon. Though this so-called hybridization method leads to vastly increased bandwidths numerous challenges remain. One of them deals with the differing types of network architectures that are used, and the differing amounts of signal processing that is required while routing signals within a node and from node to node. In particular, the issue of efficiently coupling data into and out of a chip in a way that facilitates the fabrication and use of the technology has arisen.

Several interconnection methods, e.g. ring, star, mesh, etc., are in common usage. An optimum configuration for one method may not be best suited for other methods. For example, some nodes and data streams require more processing or conditioning of data, while other have little or no processing.

There are a number of possibilities for routing signals through a node. At one end of the spectrum are signals that are simply re-routed with little or no signal processing. At the other extreme are signals that require significant amounts of signal processing. There is a significant difference in the requirements of peripheral hardware and software for routing these two extremes of signals in and out of a node.

A method for accomplishing the distribution of signals is known as a router or hub. These components are bulky and consist of many parts. In hubs currently available, there are single fibers from which optical signals are converted into electrical signals that are then brought in to a central processing unit (CPU) and then rerouted and sent to other separate lasers for retransmission. This process is cumbersome and inefficient.

Ideally, what is needed is a network with wide channels, fast links, small and reliable connectors, low power, low latency, and minimal impact on higher-level communication protocols. What is needed is a way of accommodating a broader range of interconnection topologies without increasing the complexity of manufacturing them. What is needed is a way of handling such diverse requirements that does not increase manufacturing complexity. What is needed is a way of reducing the bulk and complexity of present systems and avoiding the problems associated with optical mirrors. What is needed is a way to simplify the number of fibers connecting nodes. What is needed is a means for reducing the latency so that it is not a significant factor in limiting data transfer. In other words, what is needed is a way of transferring data from one node in a network to any other node in the network in a bit-parallel manner in such a way that each intervening node that touches the data (whether switch or network interface is controller—NIC) minimizes the time required to process data through.

SUMMARY OF THE INVENTION

The present invention is an apparatus for communicating data on and off an integrated circuit or chip in a network node. In one embodiment the chip has a silicon substrate, and has peripheral components implemented using CMOS technology. The CMOS circuitry facilitates the transfer of incoming data (from the node itself or from another node) to other nodes. The arrangement of the transmitters and receivers along with associated circuitry is done to optimize the network topology.

This invention pertains to methods of grouping or bundling the transmitters and receivers, and of the optical fibers used to communicate the data. In particular, it involves the arrangement of the optical transmitters and receivers that are used in optoelectronic circuits so that signals can be routed most efficiently for a given network topology. The network topologies include ring, star, routers, and crossbars. Depending on design parameters, some signals require very little signal processing while other signals require a substantial amount. At one extreme, little additional signal processing is required; the signal is simply re-routed out of the chip. For this type of arrangement the transmitters and receivers can be paired together in a close relationship, such as interdigitated. In other cases, it is necessary to reprocess the data, e.g. apply error correction techniques, prior to re-transmitting it. This requires more processing circuitry, and having the transmitters separate from the receivers allows more room for circuitry.

In one embodiment, the transceiver pairs are interdigitated, meaning that columns of transmitters and receivers are located side by side. The optical fibers, i.e., the means of coupling the signals on and off the chip, are connected to the transceiver pair. The interdigitated transceivers provides a highly efficient and compact network topology due to the close proximity of the transmitter and receiver pairs.

Interdigitated transceivers are appropriate when there is minimal signal processing required before retransmitting the data, because the extent of the data processing is limited by the available space. Using present standards, the constraints on the pitch of the transmitter-receiver pairs are due to thermal dissipation requirements and the need for providing means for supplying power to large numbers of transceivers. The pitch is currently 125 microns, though it is expected that it will be reduced as the technology advances. Thus, the minimum area for any associated peripheral CMOS circuitry is 125×125 microns squared. This relatively small amount of area leaves little room for sophisticated on-chip signal processing a few hundred logic gates at most. A noise issue must also be addressed since there are digital logic devices operating inside an analog portion of chip. For signals that do not require significant amounts of signal processing, this approach works well. This embodiment provides bidirectional signal pairs for full-duplex communication between connected nodes.

One advantage of the present invention is that it enables high density, high bandwidth interconnects between network nodes. Another advantage of this invention is that it enables increased connectivity of the network and a reduction in size of the routing capability.

An object of this invention is an apparatus for sending and receiving data in a network that includes a silicon substrate, peripheral CMOS circuitry, transmitters and receivers for the data, and optical communication means to communicate the data from the network node. Furthermore, the optical communication means connected to the transmitters may be bundled together and the optical communication means connected to the receivers may be bundled together. One object of this invention includes where the transmitters are grouped together. A further object of this invention also includes where the receivers are grouped together.

Yet a further object of this invention is an apparatus that allows diverse network topologies such as ring, star, mesh, and crossbar to communicate among and between each other with simple processing.

An additional object of this invention is a means for connecting one or more fibers in bundles to a single substrate, whereby the substrate contains digital logic capability to perform data processing.

Another object of this invention is the ability of bringing together multiple fiber bundles into individual transceiver chips for complicated network architectures. Such a system may also provide interconnections consisting of multiple, bidirectional fiber bundles to create higher-level network topologies.

In one embodiment of this invention the fibers are clustered, so all of the fibers are brought into a single chip. Thus, a transceiver is now a hub or router. In contrast, existing routers and hubs normally contain transceiver chips with discrete transceiver chips for each channel.

The IC of the present invention are transceiver chips so that different fibers carry information to or from the single chip—or a single fiber bundle could carry some signals to the chip and other away from the chip. The optical fibers are interconnected directly on top of or very close to the surface of the array. No bulk optics is needed and no fusing of images from separate transmitted and received arrays is required to get the two types of signals into the fiber bundle.

An object of the invention is an optoelectronic apparatus for transmitting and receiving digital data over fiber optics, comprising a silicon substrate with embedded electronic circuitry and a means of processing, a plurality of optical transmitters attached to the silicon substrate, a plurality of optical receivers attached to the silicon substrate, a plurality of optical fibers interconnecting the plurality of optical transmitters and the plurality of optical receivers on a first end, wherein a physical arrangement of the optical fibers at a second end correspond with a physical arrangement on the first end.

A further object is an optoelectronic apparatus, wherein the fiber optics individually interconnect to each transmitter and each receiver on the first end. Additionally, the plurality of optical fibers are subdivided into bundles, wherein the bundles connect to a plurality of optical devices. The bundles have a number of embodiments, including where some of the bundles are routed off the silicon substrate, some of the bundles are arranged in channels, some of the bundles connect to different topologies, some of the bundles comprise only transmitters, some of the bundles comprise only receivers, and wherein the bundles are routed to configure a desired architecture.

Another object of the invention is an optoelectronic apparatus for transmitting and receiving digital data over fiber optics, comprising a silicon substrate with embedded electronic circuitry and a processing means, a plurality of optical transmitters attached to the silicon substrate and grouped in a pattern, a plurality of optical receivers attached to the silicon substrate and grouped in a pattern, a plurality of optical fiber bundles which are independently, removably connectorized on the chip interconnecting the plurality of optical transmitters and the plurality of optical receivers on a first end through an image guide, wherein a physical arrangement of the optical fibers at a second end correspond with a physical arrangement on the first end.

An object of the invention includes an optoelectronic apparatus wherein the optical transmitters and the optical receivers have a number of different embodiments, including where the optical transmitters and the optical receivers are grouped interdigitated on the silicon substrate, the optical transmitters and the optical receivers are grouped in columns, the optical transmitters are grouped together, the optical receivers are grouped together, and where the embedded electronic circuitry and the processing means are physically separated from the optical transmitters and receivers.

A further object of the invention is a method of transmitting and receiving digital data over fiber optics, comprising the step of fabricating a silicon substrate with embedded electronic circuitry and a means of processing, attaching a plurality of optical transmitters to the silicon substrate, attaching a plurality of optical receivers to the silicon substrate, arranging the optical transmitters and the optical receivers in a pattern, interconnecting a plurality of optical fibers to the plurality of optical transmitters and the plurality of optical receivers on a first end.

Another object includes a method of transmitting and receiving digital data wherein the plurality of optical fibers interconnecting the plurality of optical transmitters and the plurality of optical receivers on a first end are physically arranged at a second end directly corresponding with a physical arrangement on the first end. Additionally, wherein the physical arrangement is a pattern that is interdigitated.

Yet an additional object is an optoelectronic apparatus for optically communicating with a plurality of network nodes, comprising a silicon substrate with embedded electronic circuitry with a plurality of optical emitters and/or detectors attached to the silicon substrate and electronically coupled to the embedded electronic circuitry. Multiple optical fibers are independently, removably connectorized onto the chip to interconnect the plurality of optical emitters and/or receivers with separate nodes of the plurality of network nodes. The plurality of emitters and/or detectors are physically grouped together in correspondence with the separate nodes of the plurality of network nodes to facilitate connection with the separate nodes over the multiple optical fibers respective of the separate nodes.

A further object includes the plurality of optical fibers subdivided into bundles of one or more optical fibers, with each bundle representing a separate node of the plurality of network nodes.

Another object is an optoelectronic apparatus wherein the plurality of emitters and/or detectors is configured to form a plurality of communication channels with one or more separate nodes of the plurality of network nodes. Additionally, wherein each of the plurality of communication channels is configured to communicate data in either one or both directions with the one or more separate nodes.

And yet an additional object is an optoelectronic apparatus, wherein the plurality of optical fibers are subdivided into bundles of one or more optical fibers with each bundle representing a separate node of the plurality of network nodes. And further, wherein individual ones of emitters are physically located next to individual ones of detectors to facilitate two directional communications with a separate node over a single optical fiber or bundle of optical fibers.

An object includes an optoelectronic apparatus wherein the embedded electronic circuitry includes digital logic circuitry for processing data received by a first detector over a first optical fiber prior to retransmission by the apparatus through a first emitter over a second optical fiber. And, wherein the first detector and the first emitter are separately located from each other on the silicon substrate to allow connection of the first and second optical fibers.

Finally, an optoelectronic apparatus wherein the first detector includes a plurality of detectors and the first emitter includes a plurality of emitters.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Still other objects and advantages of the present invention will become readily apparent to those skilled in this art from the detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

DESCRIPTION OF THE PREFERRED EMBODIMENT

To those skilled in the art, the invention admits of many variations. The following is a description of a preferred embodiment, offered as illustrative of the invention but not restrictive of the scope of the invention. This invention involves a method and apparatus for transferring data within the nodes of a communication system. The invention is for a dramatically increased capability for transmitting and receiving data within a network. These novel aspects of the present invention will be discussed in terms of several scenarios that demonstrate various embodiments of the invention.

Figure 1:
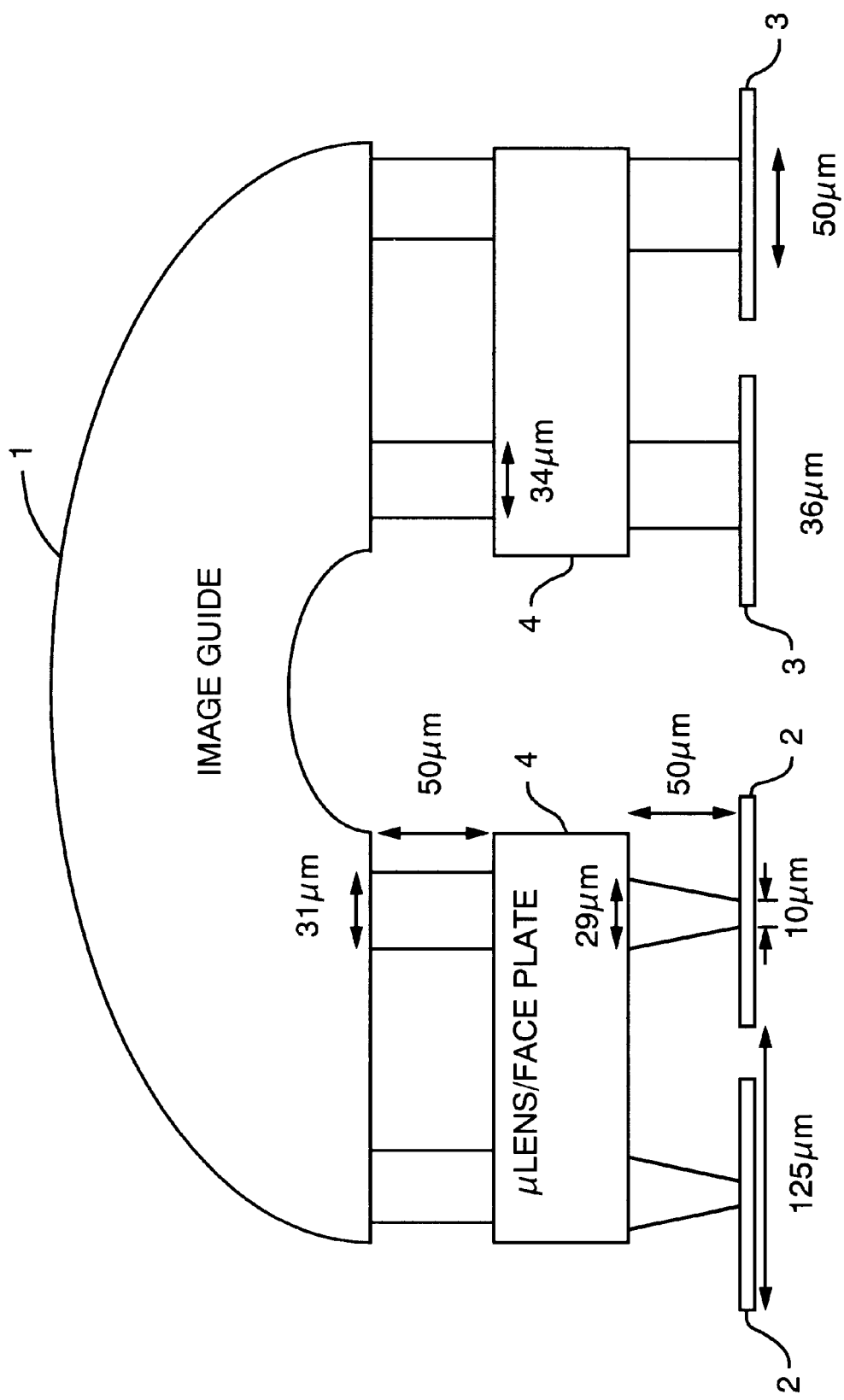
FIG. 1 Side view of optoelectronic connector to emitters and detectors

The present invention is made possible by a means of efficiently interconnecting optical fibers to emitters and detectors. In FIG. 1, a coherent bundle of optical fibers, called an image guide 1, is the transmission medium for digital optical signals. In an image guide 1, many optical fibers are bundled together in a fixed and coherent manner such that the physical arrangement of fibers at each end of the bundle correspond exactly. Thus, a particular pattern of illumination at one end of the guide will be transmitted to the other end of the bundle with a one to one correspondence.

The present invention utilizes an image guide 1 to transmit digital data from an array of emitters 2 on one chip to a corresponding geometrically similar array of detectors 3 on another chip. The image guide 1 can be arranged so that the number of fibers equals the number of emitters 2 and detectors 3 so that each emitter and each detector has a fiber optic connection. Alternatively, a much greater number of fibers can be used for the image guide 1.

In order to provide collimation for the light produced by the emitters 2, a plate 4 containing a plurality of microlenses corresponding to the geometry and distribution of the emitter array is mounted to epoxy standoffs (not shown) at a height of approximately 50 μm from the emitters 2. Alternatively, the plate 4 can consist of a coherent bundle of fibers, a very short image guide, and without the microlenses. Such an arrangement does not collimate the light, but contains and transmits it to/from the detectors/emitters mounted below. Plate 4 can contain a mixture of microlenses and fiber guides depending upon the desired application. In this example, emitters 2 are on one chip and detectors 2 are on another chip. The image guide 1 transmits the optical data back and forth between the two chips.

In a preferred embodiment, plate 4 is attached to an epoxy standoff (not shown) surrounding the periphery of the emitter/detector array. Preferably the standoff maintains the plate 4 at a height of 50 μm, which is chosen to provide adequate protection for the wafer during the connection process. In practice the smallest distance that would still protect the arrays is desirable.

Figure 2:
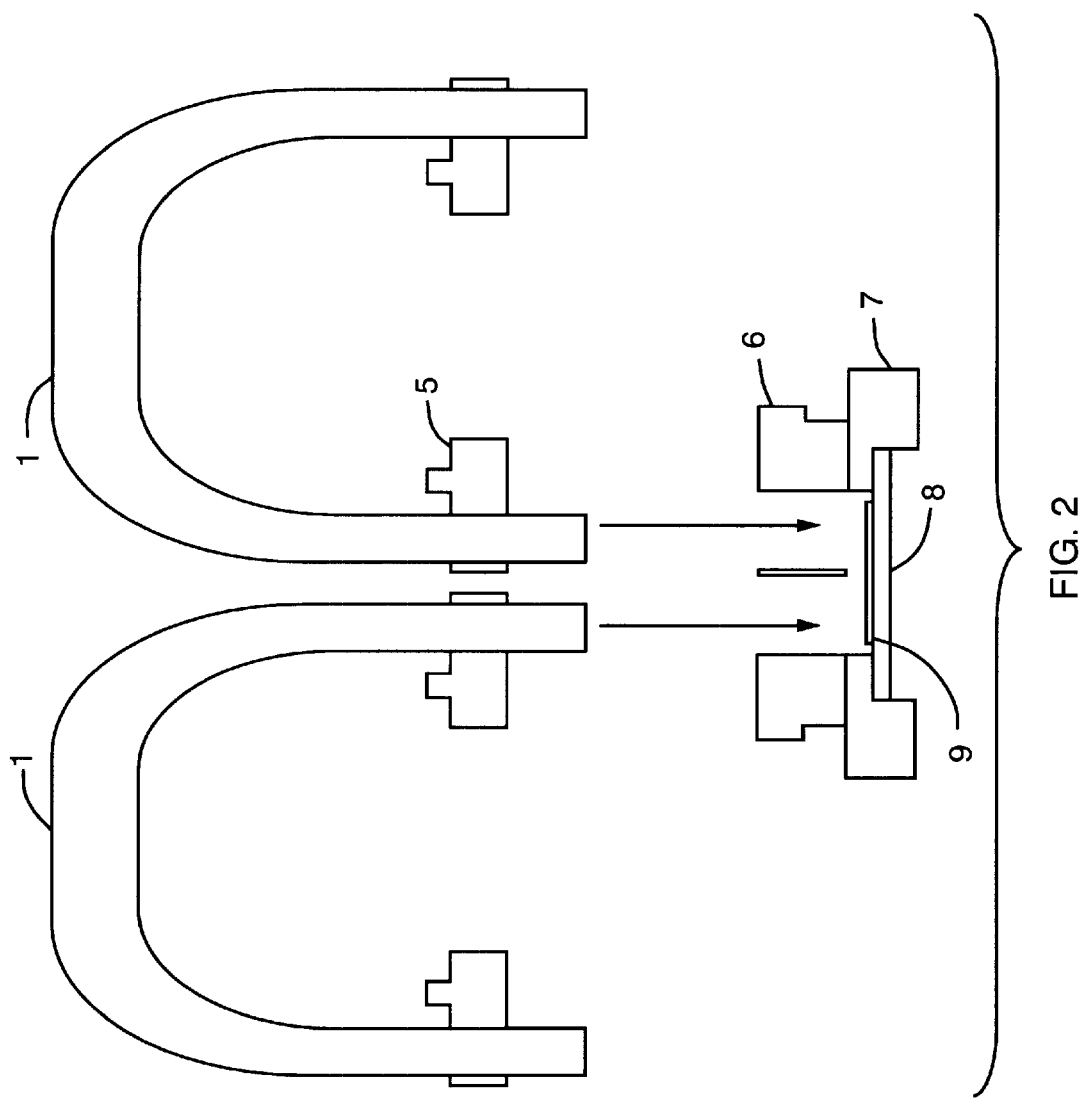
FIG. 2 optoelectronic interconnect to substrate

One technique to attach the optical interconnect is depicted in FIG. 2. The image guide 1 that houses all the fiber optic cables is retained by an image guide mounting connector 5. The image guide mounting connector 5 mates with an optical connector base 6 that is attached to a ceramic electrical package 7.

The embodiment of the preceding example provides for a "daisy chain" arrangement of connections such as one might find in a ring network topology. In a point-to-point connection, a single bidirectional array would be connected to another single array. An arbitrary number of devices can be connected together similarly. In addition, more than two fiber bundles could be attached to a single array via the same approach allowing star networks and other more complex topologies. In another embodiment, the image guide 1 is directly and permanently attached to the emitter/detector array. In this embodiment, only electrical connections are made.

By enabling a matched mating between the arranged emitters and detectors and the fiber optic cabling, there are numerous possibilities to optimize or reconfigure networks. The transmitters and detectors can be arranged for a particular application. The fiber bundles can be packaged and interconnected to alleviate processing problems and otherwise optimize system performance.

Figure 3:
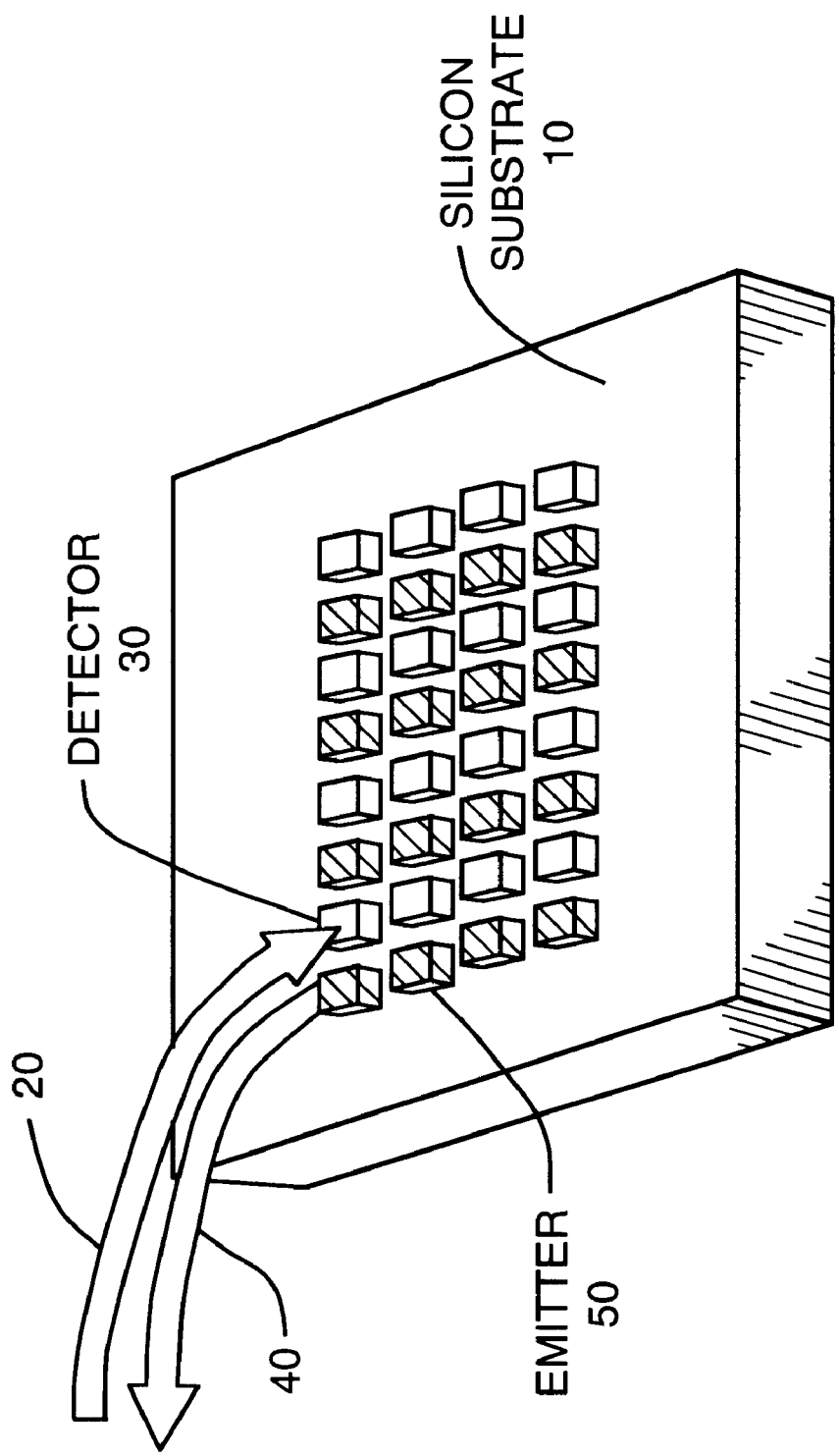
FIG. 3 diagrammatic view of single optic fibers for transmitter and receiver

As illustrated in FIG. 3, a silicon substrate 10 is the building foundation for the device. The optical emitters 50 and detectors 30 are attached on the substrate 10 with epoxy filler therebetween. Each emitter 50 has electronic circuitry embedded in the chip and connected to the chip substrate and package (not shown). Typical emitters may be 10 μm in size, constructed on 125 μm centers. Similarly, a detector array is constructed using detectors 50 μm in size, spaced identically to the emitter array.

In this embodiment, the transceiver pairs are interdigitated, meaning that the transmitter or emitter 50 and receivers or detectors 30 are located side by side in columns. The optical fibers 20, 40 are the means of coupling the signals on and off the chip, and are connected to the transceiver pair 30, 50. The embodiment shown in FIG. 3 is for a single pair of fibers—one fiber for a single transmitter 40, and another fiber for a single receiver 20. This method is suitable for single fiber (or fiber-pair) point-to-point connections. Note that referencing a bundled 'pair' of fibers refers to a "logical" pair of fibers, meaning that there are elements associated with each emitter or detector element. The "logical" fiber could be composed of a single physical fiber which carries all of the light from an emitter or to a detector or be composed of a multitude of physical fibers each of which carry a portion of the total light from an emitter or to a detector. A plurality of fibers can be used during the optical transmission wherein the emitted light from the transmitter is transmitted through a number of fibers.

The interdigitated transceivers provides a highly efficient and compact network topology due to the close proximity of the transmitter and receiver pairs. Interdigitated transceivers are appropriate when there is minimal signal processing before retransmitting the data, because the extent of the data processing is limited by the available space. For signals that do not require significant amounts of signal processing, this approach works well. This embodiment provides bi-directional signal pairs for full-duplex communication between connected nodes.

Figure 4:
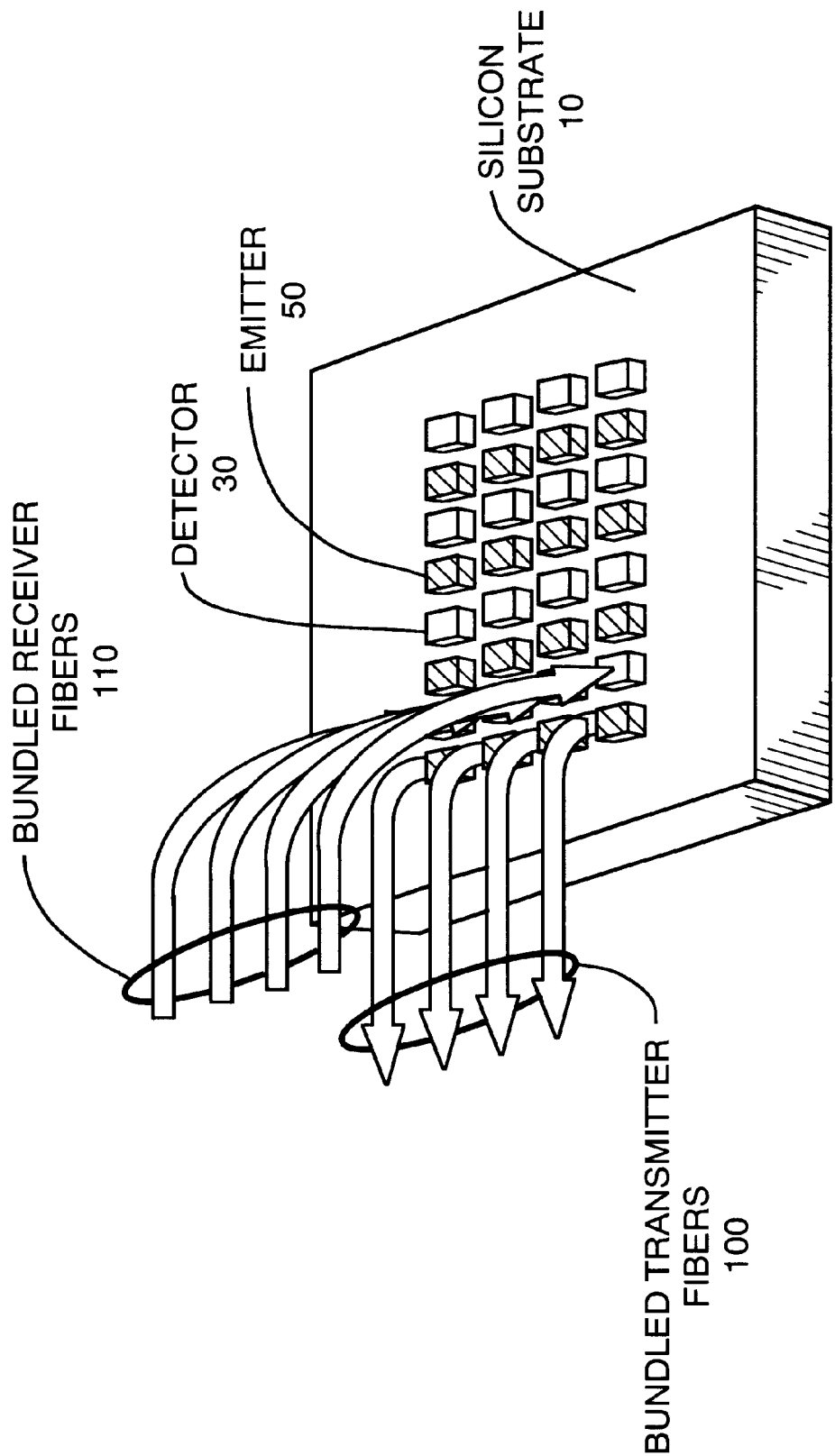
FIG. 4 diagrammatic view of bundled optic fibers for transmitters and receivers

The fibers 20, 40 can be bundled together, as shown in FIG. 4. A multitude of fibers go to a multitude of detectors 30 and emitters 50, and form bundles of transmitter fibers 100 and bundles of receiver fibers 110. Though not essential, each bundle could be associated with an individual data channel.

By bundling groups of fibers, one from transmitters 100 and the one for receivers 110, bi-directional data flow over individual fibers is achieved with fewer process steps. Bundling groups of fibers together also reduces the complexity of connecting multiple fibers from one node to another. Instead of connecting fibers one by one, they can be connected in groups, reducing the probability of misconnecting fibers.

Figure 5:
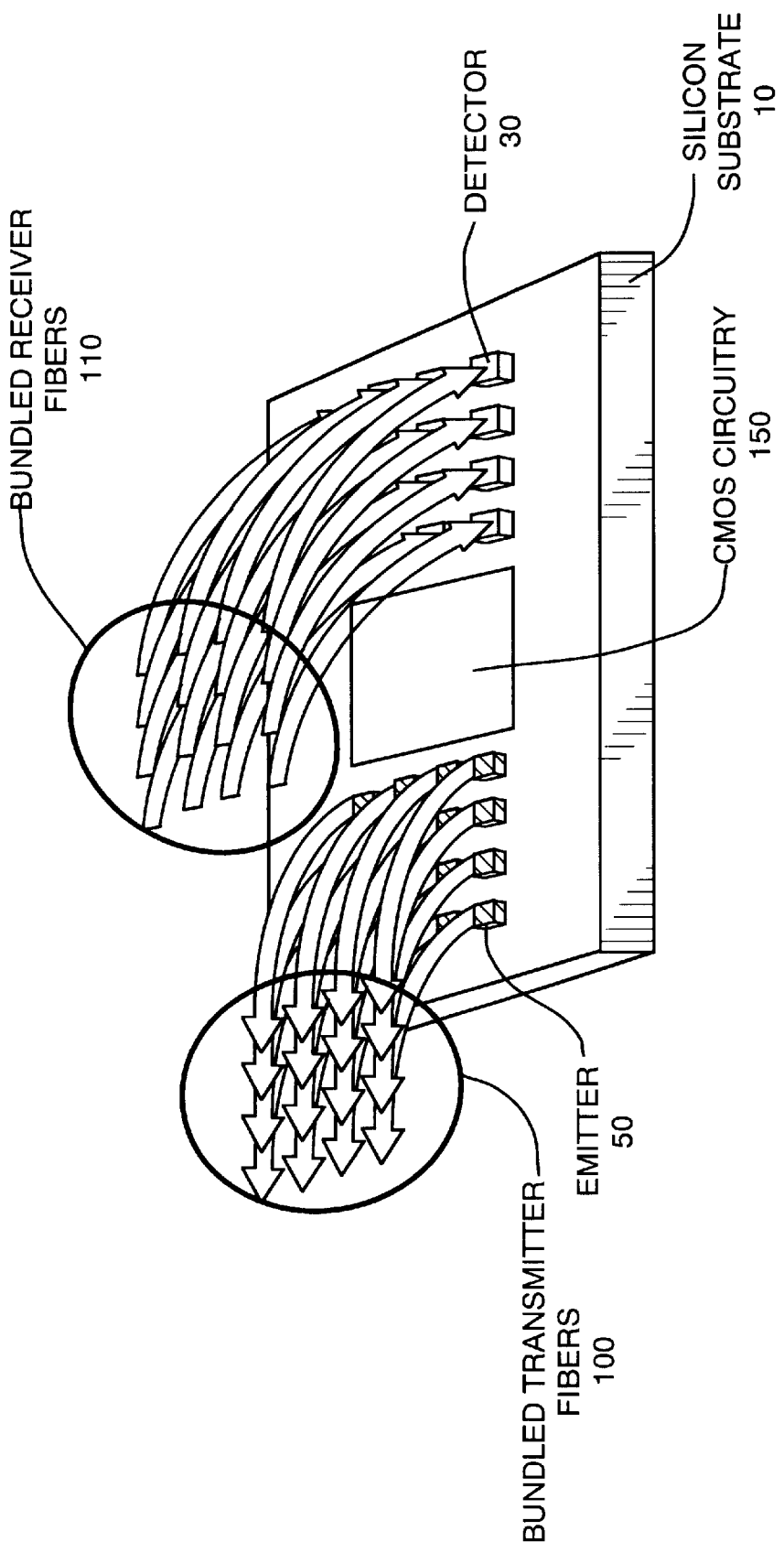
FIG. 5 depiction of bundled optic fibers for transmitters and receivers with associated electronics FIG. 6 depiction of multiple bundled optic fibers for transmitters and receivers with multiple processing electronics FIG. 7A illustration of point-to-point link FIG. 7B illustration of ring network FIG. 7C switch fabric FIG. 8A illustration of star network with leaf nodes FIG. 8B diagrammatic view of star network showing a single section of processing electronics

In another embodiment, the transmitters 50 and the receivers 30 are grouped together, and there is on-chip circuitry 150 as shown in FIG. 5. This embodiment is specifically intended for cases when the amount of on-chip processing exceeds the area available for integrated circuitry, the 125×125 micron squared area per transmitter/detector. However, this approach is also a good strategy in some cases where the allowed circuitry is smaller than the 125×125 micron squared area.

Encompassing on-chip processing capability has many advantages. The on chip circuitry provides greater flexibility for on-chip signal processing, e.g. error correction, protocol, flow control, etc. It also facilitates signal routing on and off the chip. For example, a ring topology would require two bundles, and star topology would require many bundles. It also aids in the fabrication of the devices. Integration of a multi-bundle connection requires that the placement of the fiber bundles would be distributed among different sections of the optical devices. The actual fabrication process would involve more hybridization steps, but only one substrate removal step.

As an example, the circuitry may include a central processing unit (CPU) that generates data to be sent on the network, and receives incoming message data from the network originating from other CPUs. The CPU is the processing center that directs data coming from another node or from another source. The CPU receives the incoming data/messages and is responsible for reading any header information. Depending upon which protocol is being used, the header may contain the length of the data and possibly some error correction codes. Based on the header, the CPU makes a decision to either keep the data locally, or to send it on to another destination on one of the output channels.

Note that the approaches in FIGS. 4 and 5 can be combined, to provide multiple areas on the silicon substrate where fiber bundles can be connected, while at the same time making each site a bi-directional communications port. In fact, in many cases this is the preferred approach, for example for the ring or star network topologies shown in FIG. 7B and FIG. 8A, respectively, which are discussed herein. However, it should also be noted that the same effect, i.e. a multitude of bi-directional fiber bundle sites, can be achieved using only a single site as in FIG. 4, by simply attaching multiple fiber bundles side-by-side to the single site.

In either case, one aspect of the invention is the ability to provide a multitude of multi-bit-wide, bi-directional optical communication channels directly to a silicon substrate, by means of optical transmitter and detector elements hybridized onto the silicon chip and interconnected by fiber bundles.

Figure 6:
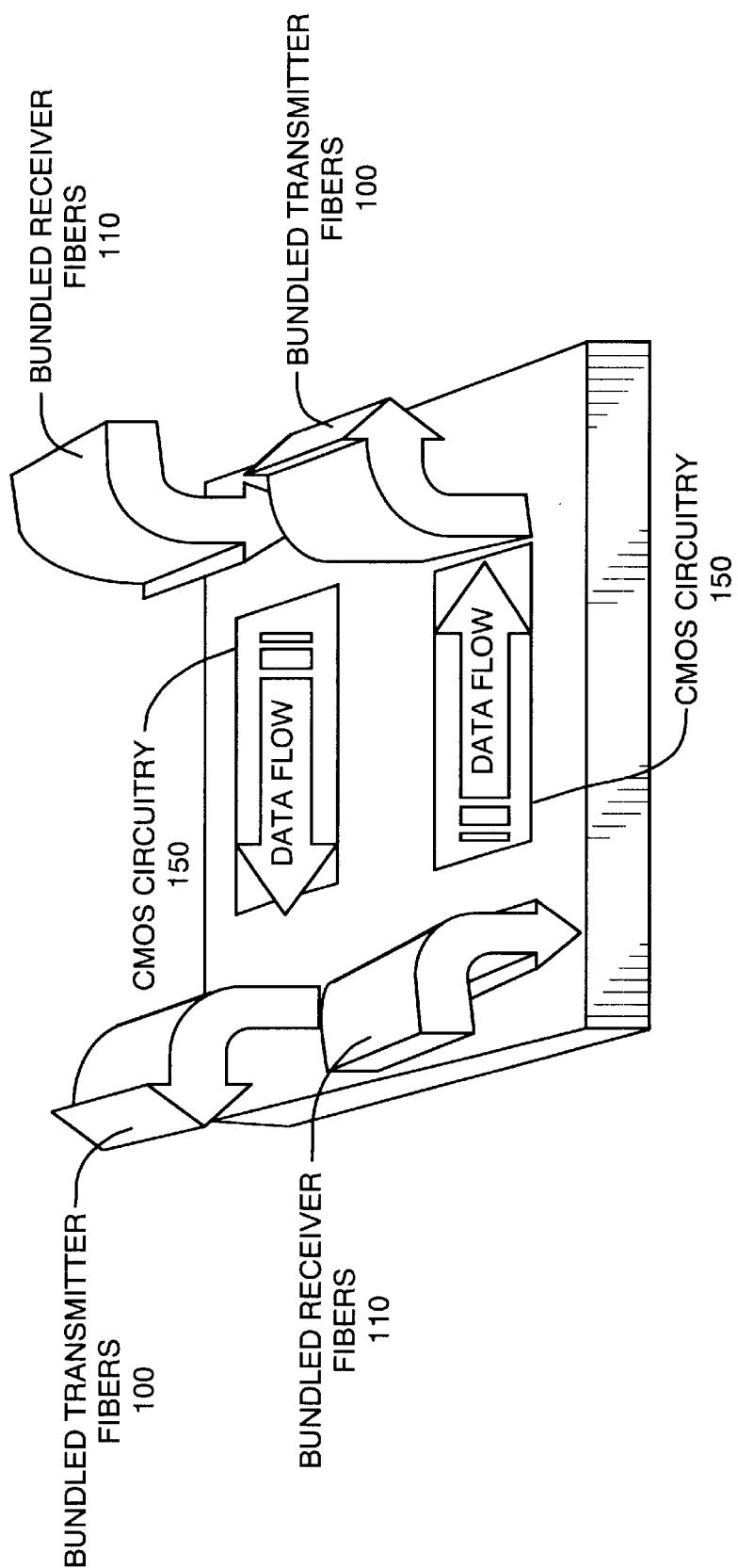

In FIG. 6, there are multiple sections of CMOS circuitry 150, wherein each section is responsible for a group of transmitters 50 and receivers 30 and the associated bundled transmitter fibers 100 and bundled receiver fibers 110. As shown in FIG. 6, the arrangement and orientation of the individual transceivers avoids complex routing. The data flow shown represents the bidirectional capability of the chip, allowing simultaneous transmission and reception amongst groupings of transmitters 50 and receivers 30.

Figure 7A:
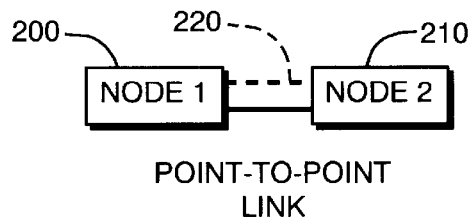
Figure 7B:
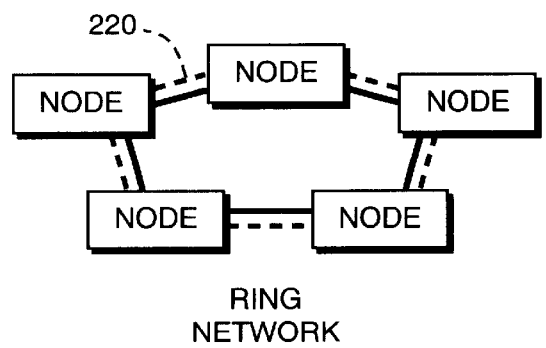
Figure 7C:
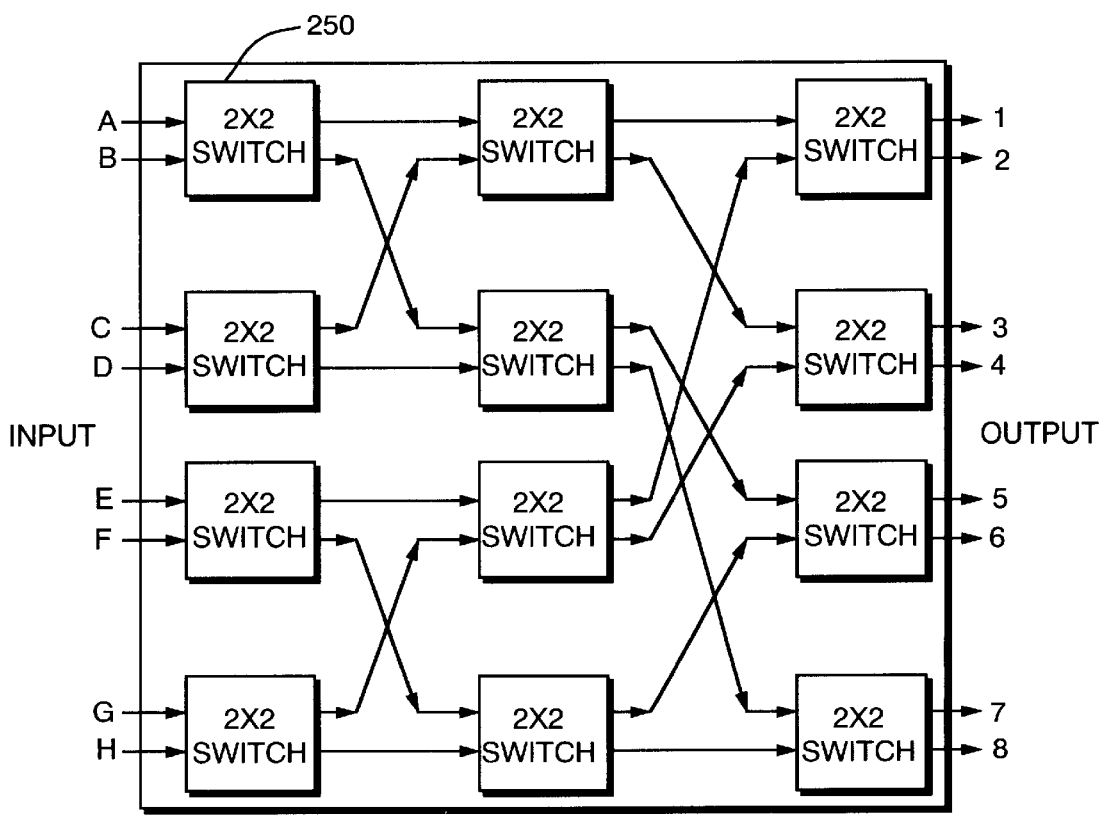

Using the arrangement of FIG. 5, a simple bi-directional point-to-point link can be established between two nodes as shown in FIG. 7A. A ring network topology can be established if each node is organized as in FIG. 6 by connecting the fiber bundles as shown in FIG. 7B. As another example, shown in FIG. 7C, a switch fabric contains a plurality of 2×2 switches 250 can be built so that any Input (A–H) can connect to any Output (1–8).

Figure 8A:
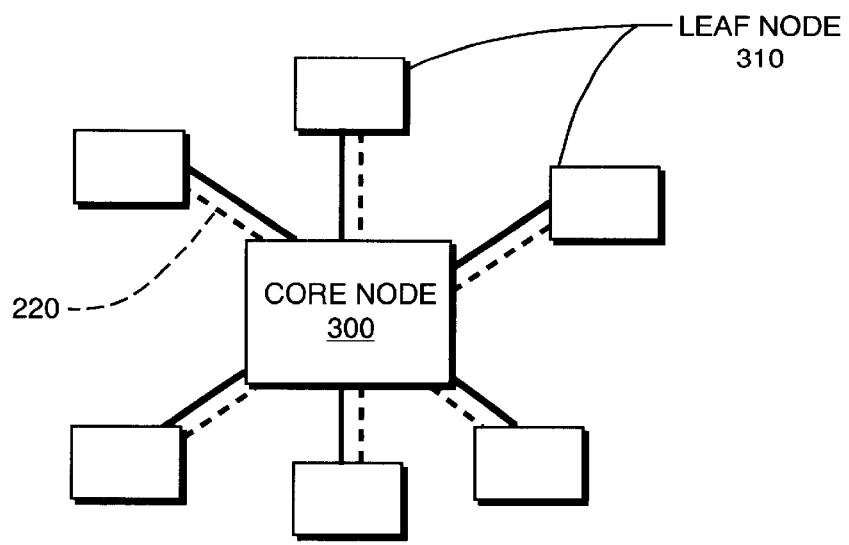
Figure 8B:
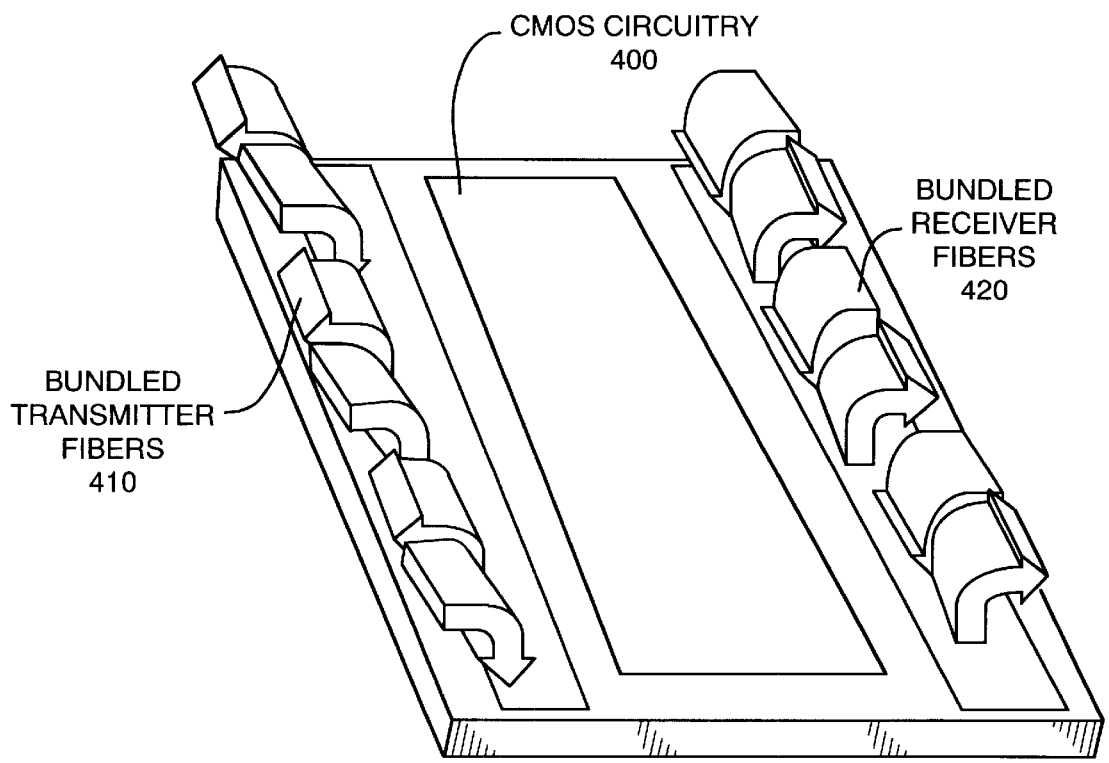

As a final example, a diagrammatic view of a star topology with multiple I/O is shown in FIGS. 8A and 8B. There are a plurality of bundles of transmitter fibers 410 and a plurality of receiver fibers 420 inter-connecting the transmitters and receivers of the chip. In this example, the bundled fibers 410, 420 connect to a number of leaf nodes 310 to form the star configuration. The star configuration has a central or core node 300 and is surrounded by leaf nodes 310. The leaf nodes 310 and the central node 300 have a bi-directional data flow 220 that is achieved by arranging the transmitter fibers 410 and the receiver fibers 420 that connect to the leaf nodes.

The CMOS circuitry 400 in a star configuration requires more extensive processing abilities in order to handle the functionality of processing multiple data transfer sessions at the same time. FIG. 8B shows the bidirectional nature of the data flow on both the bundled transmitter fibers 410 and the bundled receiver fibers 420. The interconnection permits bidirectional data transfer of variable size packets.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. An optoelectronic apparatus for optically communicating with a plurality of network nodes, comprising;

a substrate with embedded electronic drive circuitry;

a plurality of optical emitters and/or detectors attached to said substrate and electronically coupled to said embedded electronic drive circuitry; and a plurality of optical fiber bundles which are independently, removably connectorized onto the substrate to interconnect said plurality of optical emitters and/or detectors with separate nodes of said plurality of network nodes, wherein the plurality of emitters and/or detectors are physically grouped together in correspondence with the separate nodes of the plurality of network nodes to facilitate connection with the separate nodes over said multiple optical fibers respective of the separate nodes.

2. An optoelectronic apparatus according to claim 1, wherein said plurality of emitters and/or detectors are grouped together to form a plurality of communication channels with one or more separate nodes of said plurality of network nodes.

3. An optoelectronic apparatus according to claim 2, wherein each of said plurality of communication channels are configured to communicate data in either one or both directions with the one or more separate nodes.

4. An optoelectronic apparatus according to claim 1, wherein said network nodes are configured from the group consisting of ring, star, mesh, router and crossbar.

5. An optoelectronic apparatus according to claim 1, further comprising a processing section on said substrate.

6. An optoelectronic apparatus according to claim 1, further comprising an optical plate.

7. An optoelectronic apparatus according to claim 1, wherein said optical transmitters and said optical receivers are arranged as two side-by-side arrays.

* * * * *